United States Patent [19]

Tsuda

[11] Patent Number: 5,277,953
[45] Date of Patent: Jan. 11, 1994

[54] LAMINATED VENEER LUMBER AND DECORATIVE LAMINATED SHEET UTILIZING THE SAME

[75] Inventor: Sotaro Tsuda, Aichi, Japan
[73] Assignee: Sotaro Tsuda, Aichi, Japan
[21] Appl. No.: 827,296
[22] Filed: Jan. 29, 1992

[30] Foreign Application Priority Data

Nov. 11, 1991 [JP] Japan ............... 3-322491

[51] Int. Cl.⁵ ............ B32B 3/00; B32B 3/10; B32B 5/12
[52] U.S. Cl. ............................. 428/53; 428/54; 428/81; 428/106; 428/537.5; 428/114; 428/906
[58] Field of Search ............. 428/53, 54, 106, 537.5, 428/81, 114

[56] References Cited

U.S. PATENT DOCUMENTS

| | | | |
|---|---|---|---|
| 2,565,251 | 8/1951 | Malmstrom | 428/106 |
| 3,287,195 | 11/1966 | Piazze . | |
| 3,312,582 | 4/1967 | Allan et al. | 428/106 X |
| 3,713,944 | 1/1973 | Dennis et al. . | |
| 3,969,558 | 7/1976 | Sadashige | 428/106 X |
| 3,977,933 | 8/1976 | Sadashige | 428/54 X |
| 3,990,142 | 11/1976 | Weglin . | |
| 4,061,169 | 12/1977 | Hasegawa . | |
| 4,320,572 | 3/1982 | Brower et al. . | |
| 4,473,099 | 9/1984 | Koike et al. . | |
| 4,494,588 | 1/1985 | Berry et al. . | |
| 4,689,257 | 8/1987 | Baum | 428/106 |
| 4,791,970 | 12/1988 | Walser et al. . | |
| 4,793,393 | 12/1988 | Pelz . | |
| 5,071,688 | 12/1991 | Hoffman | 428/106 |

FOREIGN PATENT DOCUMENTS

| | | |
|---|---|---|
| 55-26961 | 7/1980 | Japan . |
| 62-16803 | 4/1987 | Japan . |
| 63-7122 | 2/1988 | Japan . |
| 1-4881 | 1/1989 | Japan . |
| 1-37243 | 8/1989 | Japan . |

*Primary Examiner*—P. C. Sluby
*Attorney, Agent, or Firm*—Lowe, Price, LeBlanc & Becker

[57] ABSTRACT

The present invention provides high quality laminated veneer lumber as a material for such uses as in architecture and furniture, and a method of mass production thereof using veneer which is flattened in advance. A sheet of veneer is obtained by cutting a log with a rotary lathe or the like, and flattening and cutting the same into a predetermined length. Sheets of veneer thus obtained are cut on both edges in the grain direction to form symmetrically diagonal end faces and bonded with one another at said end faces with their grain directions aligned to form an elongated sheet of veneer. The resultant elongated sheet of veneer is cut into a predetermined length to form a laminated veneer material having seams a. Plural sheets of thus formed laminated veneer material are laminated and bonded with their grain directions aligned to form laminated veneer core 3. The laminated veneer core 3 is either directly used as a laminated veneer lumber, or is covered with another sheet of seamless veneer 4 on its surface.

4 Claims, 7 Drawing Sheets

FIG. 9

LAMINATED VENEER LUMBER AND DECORATIVE LAMINATED SHEET UTILIZING THE SAME

FIELD OF THE INVENTION

The present invention relates to a laminated veneer lumber which is widely used in architecture, furniture, vehicles and ships, packages and the like and decorative laminated sheet utilizing the laminated veneer lumber. It also relates to a method of manufacture therefor.

BACKGROUND OF THE PRIOR ART

Laminated veneer lumber comprising veneer sheets which are obtained by cutting a log into a thickness of 2-3 mm by a rotary lathe or a slicer, and by laminating and bonding the same with the grain directions arranged primarily in parallel is widely used as the material for structures and fixtures of a wooden house such as a door, a door frame, a door casing and a door stop, and for various other items and as a hardwood structural material that combines a decorative material such as a faceplate, a frame and a leg of furniture, a wall trim for ceiling, a skirting, and a base, a faceplate, a door or a counter top of a cupboard.

Laminated veneer lumber (hereinafter LVL) is obtained from logs of broad-leaved trees such as lauans and beech wood, or of acicular trees such as North American woods, Japanese cypress and cedar by chopping the log into cross segments of a given length and cutting the segments into veneer sheets of 2-3 mm thickness using a rotary lathe. Veneer sheets thus obtained are dried using a veneer drier, laminated by arranging them in parallel in the grain direction, and bonded with adhesive. The laminated veneer sheets are subjected to cold press for provisional compression prior to hot press for heat compression. Alternatively, the laminated veneer sheets may be simply subjected to continuous press processing. Subsequently, the lamination of veneer sheets is flattened, cut into a given width and ground on its surface alone with a sander to obtain an LVL.

The prior art method of manufacturing LVL is defective in that a rotary-cut or sliced veneer sheet is generally wavy over its entirety rather than flat. It is difficult to flatten the veneer sheet obtained by the prior art method even if drying is conducted under pressure, and wavy veneer sheets cannot be firmly bonded with one another when laminated using adhesive.

It is also extremely difficult to obtain a laminated veneer lumber which is generally flat even if the lamination of veneer sheets is subjected to cold and hot presses, or simply to a continuous press processing.

It is therefore an object of the present invention to provide an efficient method of mass-producing a laminated veneer lumber of high quality and to provide an excellent decorative sheet by subjecting the laminated veneer lumber thus obtained to a very simple processing.

SUMMARY OF THE INVENTION

According to the present invention, a generally flat veneer sheet is cut into sections of a predetermined length, the end faces of each section on both edges in the grain direction being cut symmetrically diagonal with each other. By bonding the sections at said end faces with adhesive while arranging the grains in the same direction, an elongated sheet of laminated veneer is obtained. The elongated sheet of laminated veneer is cut into sections of a predetermined length along the grain direction to obtain sheets of laminated veneer material having seams. Plural sheets of laminated veneer material are laminated with their grain directions arranged in parallel to obtain a laminated veneer sheet core, which in turn is bonded integrally with a generally flat and seamless veneer.

The decorative laminated sheet material of the present invention is characterized in that veneer sheets of a predetermined length and having end faces cut symmetrically diagonal at both edges in the grain direction are connected at said end faces with their grain directions aligned to obtain an elongated sheet of laminated veneer. The elongated sheet of laminated veneer thus obtained is cut along the grain direction into sections of a predetermined length to form sheets of laminated veneer material with seams. Plural sheets of laminated veneer material are laminated and bonded with adhesive with their grain directions arranged in parallel with one another to form a laminated veneer core. A sheet of generally flat and seamless veneer is integrally bonded on the surface of said laminated veneer core to provide a laminated veneer lumber which is to be cut into desired shapes.

The method of manufacturing the laminated veneer lumber comprises the following steps:

(1) A thin sheet of veneer cut from a log by a rotary lathe or a slicer is cut into a predetermined length, subjected alternately to hot and cold presses to flatten the entire veneer sheet;

(2) The end faces in the grain direction of each flattened veneer sheet are diagonally cut in symmetry with each other;

(3) Plural veneer sheets having symmetrically diagonal end faces are bonded with one another at said end faces with their grain directions aligned to obtain an elongated sheet of laminated veneer;

(4) The elongated sheet of laminated veneer is cut along the grain direction into a predetermined length to obtain sheets of laminated veneer material having seams, which are laminated with their grain directions aligned with one another, and a thin sheet of seamless veneer is overlaid on and bonded to said laminated veneer material.

Another method of manufacturing laminated veneer lumber comprises the following steps:

(a) In preparing thin sheets of rotary-cut veneer from a log using a rotary lathe, the log surface to be cut by a veneer knife is pressed with a pressure bar;

(b) The rotary-cut veneer sheet is cut into sections of a predetermined length, and alternately subjected to hot and cold presses to flatten the entire veneer sheet;

(c) The end faces of a rotary-cut veneer sheets are cut symmetrically diagonal on both edges in the grain direction;

(d) Plural veneer sheets are bonded at their symmetrically diagonal end faces with their grain directions aligned to obtain an elongated sheet of laminated veneer;

(e) The elongated sheet of laminated veneer is cut along the grain direction into a predetermined length to obtain sheets of laminated veneer material with seams, plural sheets of the resultant laminated veneer material with seams are laminated with their grain directions aligned, and a thin sheet of seamless veneer is overlaid on and bonded to the thus laminated veneer material.

Still another method of manufacturing laminated veneer lumber comprises the following steps:

(a') A thin sheet of veneer obtained by a rotary lathe or a slicer is cut into a predetermined length, subjected alternately to hot and cold presses to flatten the entire veneer sheet;

(b') The end faces in the grain direction of each flattened veneer sheet are diagonally cut in symmetry with each other;

(c') Plural veneer sheets having symmetrically diagonal end faces are bonded at said end faces with their grain directions aligned to obtain an elongated sheet of laminated veneer;

(d') The elongated sheet of laminated veneer is cut along the grain direction into a predetermined length, plural sheets of resultant laminated material having seams are laminated and bonded with their grain directions aligned.

Although veneer sheet to be used in the laminated veneer lumber according to the present invention is not specifically limited on the wood material and thickness so long as it is obtained by slicing a log with a rotary lathe or a slicer and is sufficiently thin, the thickness is preferably between 2-3 mm and the width generally between 600-1200 mm in view of workability. These values may be varied to correspond to the planar area of the laminated veneer lumber or decorative laminated sheet material to be obtained. Veneer sheet usually comes in dried state but is still supple enough for easy processing, and thus is generally wavy and not flat. Veneer is therefore alternately subjected to hot and cold presses to be flattened. This step results in compacted veneer sheet with even surfaces both at the front and the back.

A generally flat sheet of veneer thus obtained is cut symmetrically diagonal at its end faces in the grain direction, and plurality of such sections are connected and bonded at said diagonally cut end faces to form an elongated sheet of veneer wherein the grains run in the same direction. The elongated sheet of veneer thus obtained is cut along the grain direction into a predetermined length to obtain sheets of laminated veneer material with seams, which in turn are laminated with their grain directions aligned to form a laminated veneer core.

Although the veneer used in the laminated veneer core preferably contains least possible knars and cracks, knars and cracks are allowable so long as the quality and the strength of the core are maintained.

The laminated veneer core has seams, and is to be covered with a generally flat sheet of seamless veneer on its surface to form laminated veneer lumber.

Veneer sheet to be overlaid on and bonded to the surface of the laminated veneer core is not specifically limited in the wood material and thickness so long as it is seamless. They may be the veneer sheets of the wood material which is the same as or different from said veneer material, and of the thickness similar to that of the core material, or of about 0.5 mm.

The term "seamless veneer" used herein includes those that are so connected that the seams are made inconspicuous, as well as those physically free of seams.

In the foregoing, the laminated veneer core is obtained by cutting the elongated sheet of laminated veneer with seams into sections of a predetermined length and laminating said sections with the grain directions arranged in parallel. However, it is also possible to laminate the elongated sheets of veneer with seams with the grain directions arranged in parallel and then cut the same along the grain direction into a predetermined length to obtain the core.

The laminated veneer core thus obtained need not always be covered with a seamless veneer on its surface to obtain the laminated veneer lumber of the present invention. The veneer core having seams on its surface can be effectively used as it is as a core material for various structural members.

According to the present invention laminated veneer lumber comprising plural layers of veneer material, plural sheets of generally flat veneer having symmetrically diagonal end faces are bonded with each other at said end faces to obtain an elongated veneer sheet and the resultant elongated veneer sheet is cut into sections of a predetermined length and laminated to obtain a laminated veneer core. Therefore, any desired type of laminated veneer lumber can be obtained by varying the type of veneer sheet which is placed on top of the surface of the laminated veneer core.

As the decorative laminated sheet according to the present invention is obtained by cutting said laminated veneer lumber, any desired type of decorative sheet can be obtained by varying the type of the veneer sheet which is placed on the surface of the core material as well as the type of cutting.

According to the present invention method of manufacture, a thin sheet of veneer having a predetermined length and obtained by cutting a log with a rotary lathe or a slicer is flattened prior to use by alternately subjecting the same to hot and cold presses. This facilitates cutting of the sheet to have symmetrically diagonal end faces. It also achieves firm and secure bonding of cut sheets at their end faces with adhesive.

According to another embodiment of the present invention method, the surface of a log to be cut with a rotary lathe is applied with pressure using a pressure bar, so that the resultant veneer sheets will have a fine and crack-free surface.

According to still another embodiment of the present invention method, the laminated veneer lumber will have seams on its surface. Because of excellent mechanical strength, however, the laminated veneer lumber can be effectively used as a core of various structural materials.

DETAILED DESCRIPTION OF THE PREFERRED EMBODIMENTS

Preferred embodiments of laminated veneer lumber, decorative laminated sheet utilizing the laminated veneer lumber and the manufacture method therefor according to this invention will now be described in more detail referring to the accompanying drawings.

Figure 1:
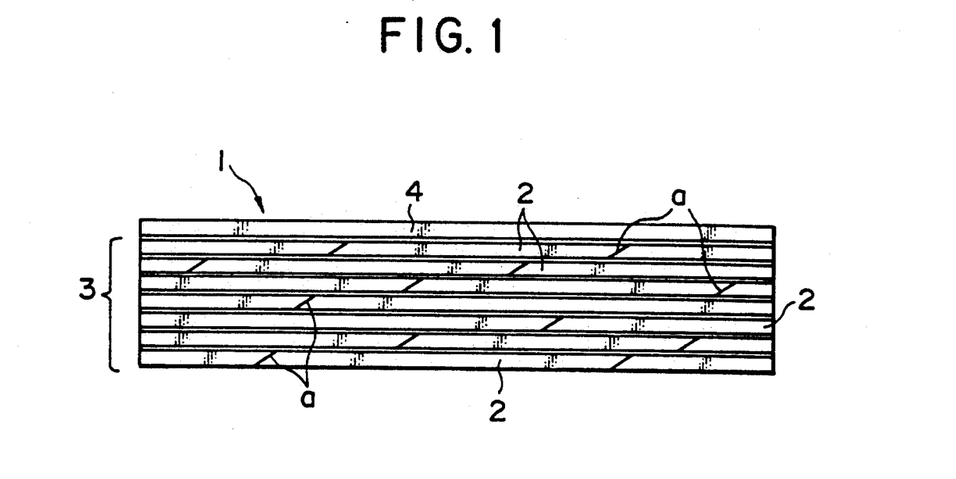
FIG. 1 is a side view to show a laminated veneer lumber according to the present invention.

FIG. 1 shows one embodiment of a laminated veneer lumber according to the present invention wherein a laminated veneer lumber 1 includes a core 3 comprising plural sheets of laminated veneer 2 of a predetermined length which is generally flat and has seams a, and a sheet of seamless veneer 4 which is laminated and bonded on the surface of said core 3.

Figure 2:
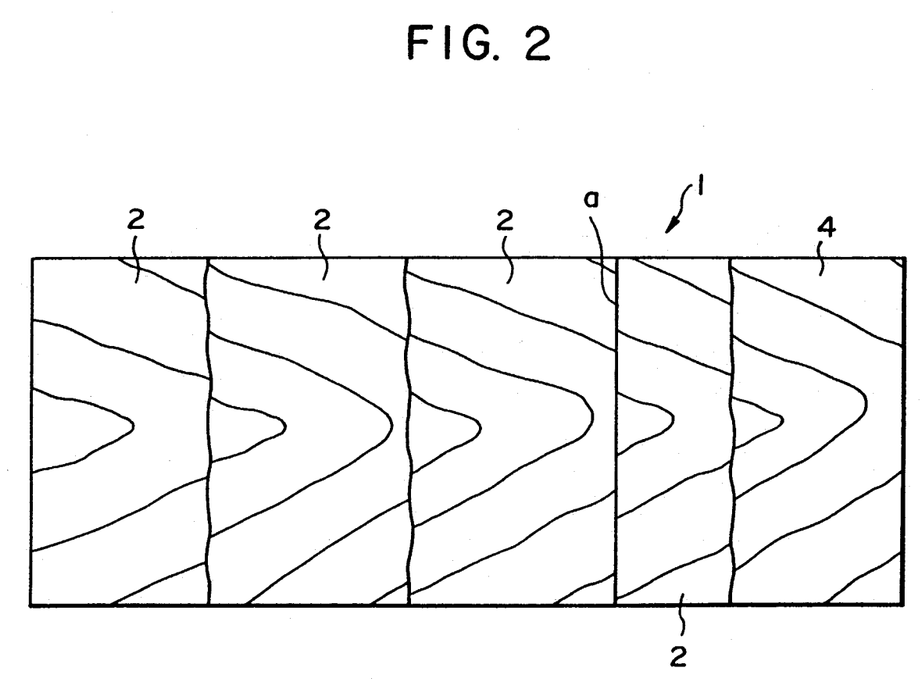
FIG. 2 is a partially exploded enlarged plan view of the laminated veneer lumber shown in FIG. 1.
Figure 4:
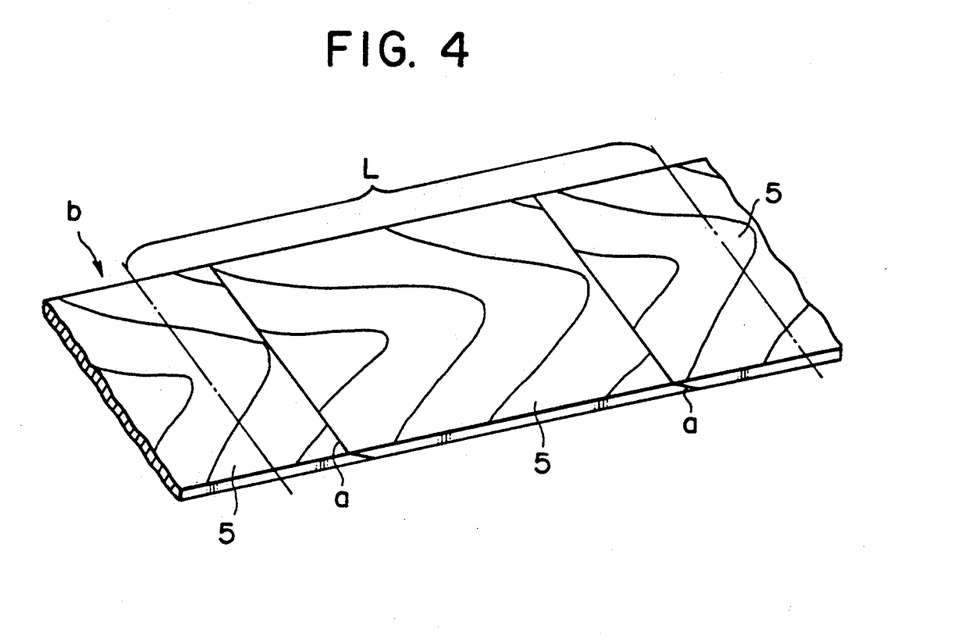
FIG. 4 is a perspective view to show a portion of an elongated sheet of laminated veneer obtained by laminating sheets of flattened veneer shown in FIG. 3.

A relatively thin sheet of veneer of a predetermined length measuring, for example, 600 mm in width and 2 mm in thickness is obtained by slicing a log with a rotary lathe or a slicer and is cut to have symmetrically diagonal end faces 5a slanted at about 45° in the grain direction across the thickness of the veneer sheet as best seen in FIGS. 1 and 2. Sheets of veneer 5, 5 to be connected are bonded with adhesive applied on the slanted end faces 5a, 5a with their grain directions aligned. The bonded veneer sheets are contact-pressed at the seams a to form an elongated veneer sheet 6. The resultant elongated veneer sheet 6 is cut along the grain direction into sheets of a given length L, as shown in FIG. 4.

Figure 5:
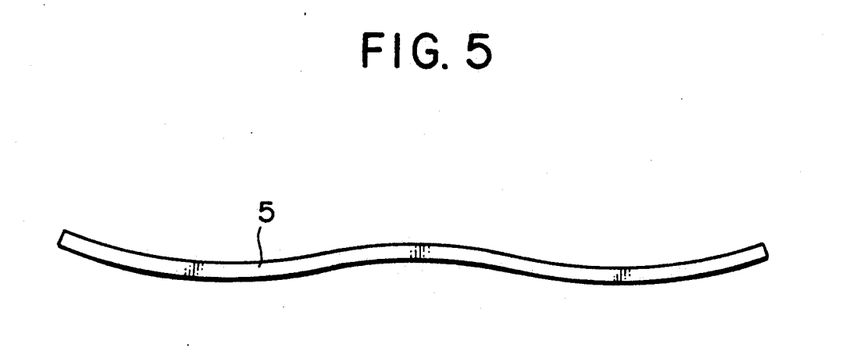
FIG. 5 is a side view to show in an exaggerated manner the veneer shown in FIG. 3 prior to flattening process.

Veneer sheets 5 of a predetermined length obtained by slicing a log with a rotary lathe or a slicer are dried using a dryer device (not shown) to remove excessive moisture while not impairing the flexibility. This drying process is likely to cause the veneer sheet to become wavy, as shown in FIG. 5. To flatten this generally wavy veneer sheet 5, the veneer is alternately subjected to hot and cold presses, to eventually obtain a flat and closely pressed veneer.

A veneer sheet 4 to be placed and bonded on the veneer core 3 may be a veneer of the same wood material as the veneer sheet 5 so long as it is seamless. A strip or sheet of sliced veneer of about 0.5 mm thickness attached with a non-woven cloth on the back thereof may also be used.

Figure 6:
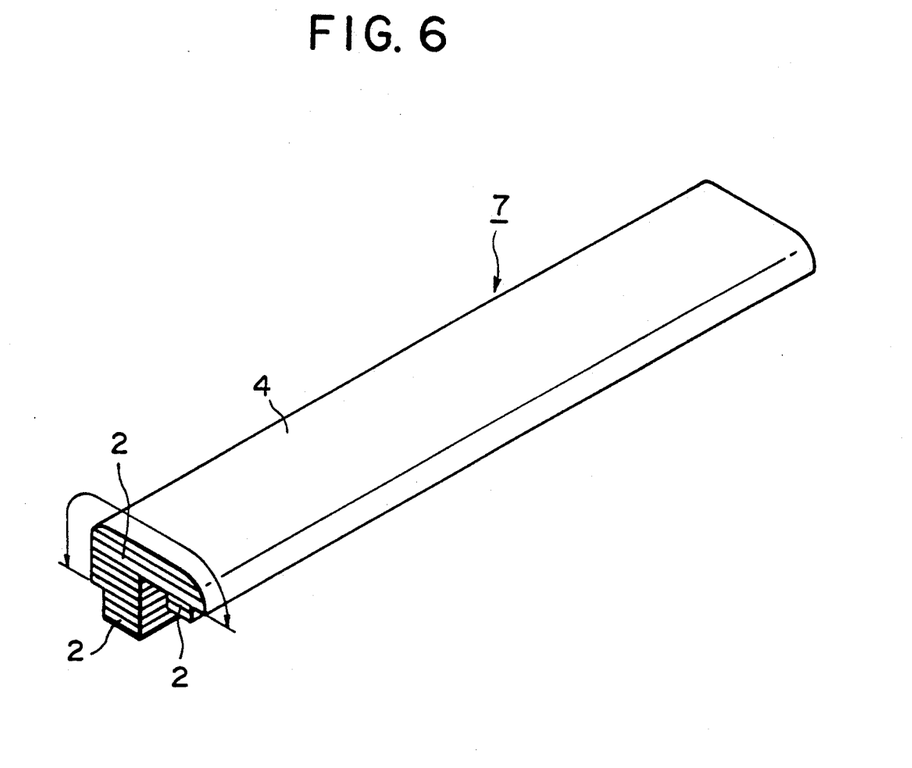
FIG. 6 is a perspective view to show a decorative laminated sheet which utilizes the laminated veneer lumber according to the present invention.

FIG. 6 shows a decorative laminated sheet which is obtained by machining the laminated veneer lumber 1 and which can be used as a casing material such as for door frames. The surface of the veneer 4 may be painted, if required, over the surface thereof alone as mentioned earlier, or over the area thereof which will be exposed, namely the scope defined by the arrow in FIG. 6.

The laminated veneer lumber 1 of the above construction is manufactured by the method described below.

Figure 7:
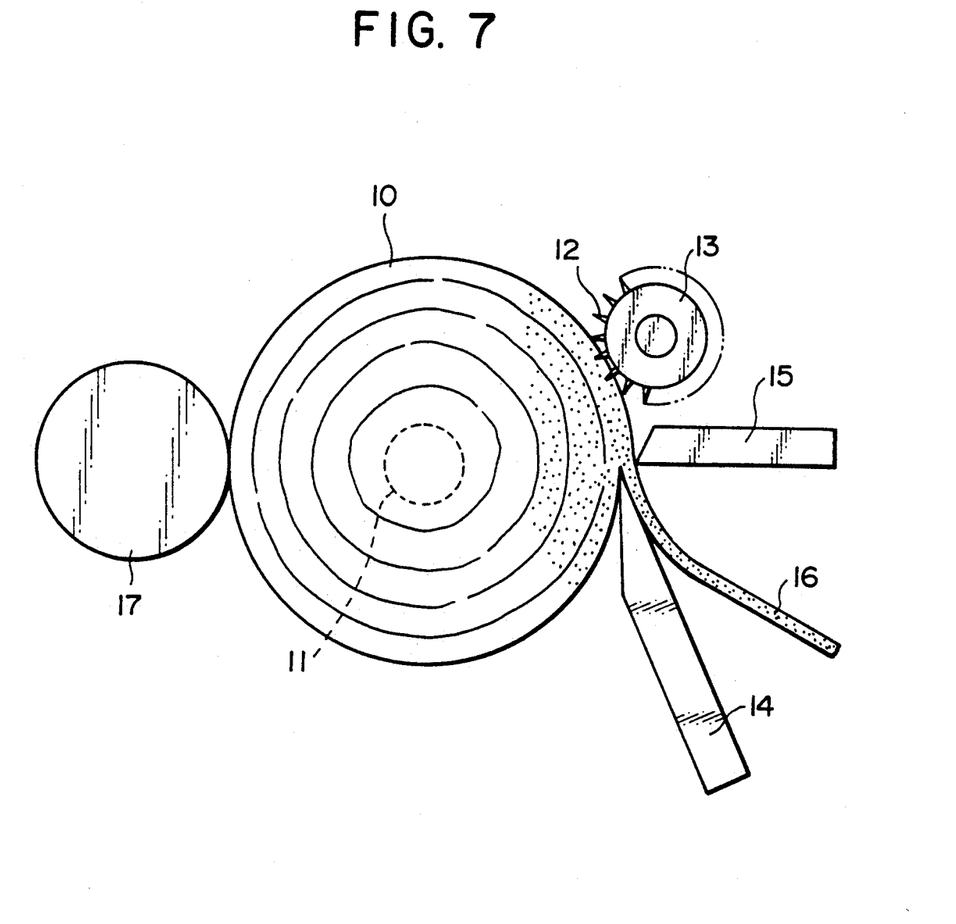
FIG. 7 is an explanatory view to show the process of manufacturing rotary-cut veneer to be used in the present invention method.

Referring to FIG. 7, the reference number 10 denotes a log of deciduous tree such as North American woods cut into sections of 1,200-3,000 mm length. The log 10 is rotatably supported by a chuck 11 on the cut faces at the center. A rotary driving roll 13 provided with plural blades 12 on its periphery is attached to the log 10 with the blades slightly biting into the log surface. A blade 14 of the rotary lathe is set at an angle so that the log 10 can be peeled for the thickness of 2-3 mm. At the same time, a pressure bar 15 is used to press the log 10 at a position immediately downstream to said blade 14 to obtain a sheet of rotary-cut veneer 16 having a compressed tissue. The back of the log 10 is constantly in contact with a back up roll 17 which does not rotate. The back up roll 17 is provided for the purpose of maintaining the log 10 under a predetermined level of pressure achieved by the pressure bar 15 with the pressurizing force even when the log diameter gradually decreases due to cutting by the blade of the rotary lathe and of obtaining veneer 16 of the uniform thickness.

Although logs of deciduous North American woods are used in the embodiments mentioned above for their availability as well as economy, the log material is not limited thereby.

Figure 8:
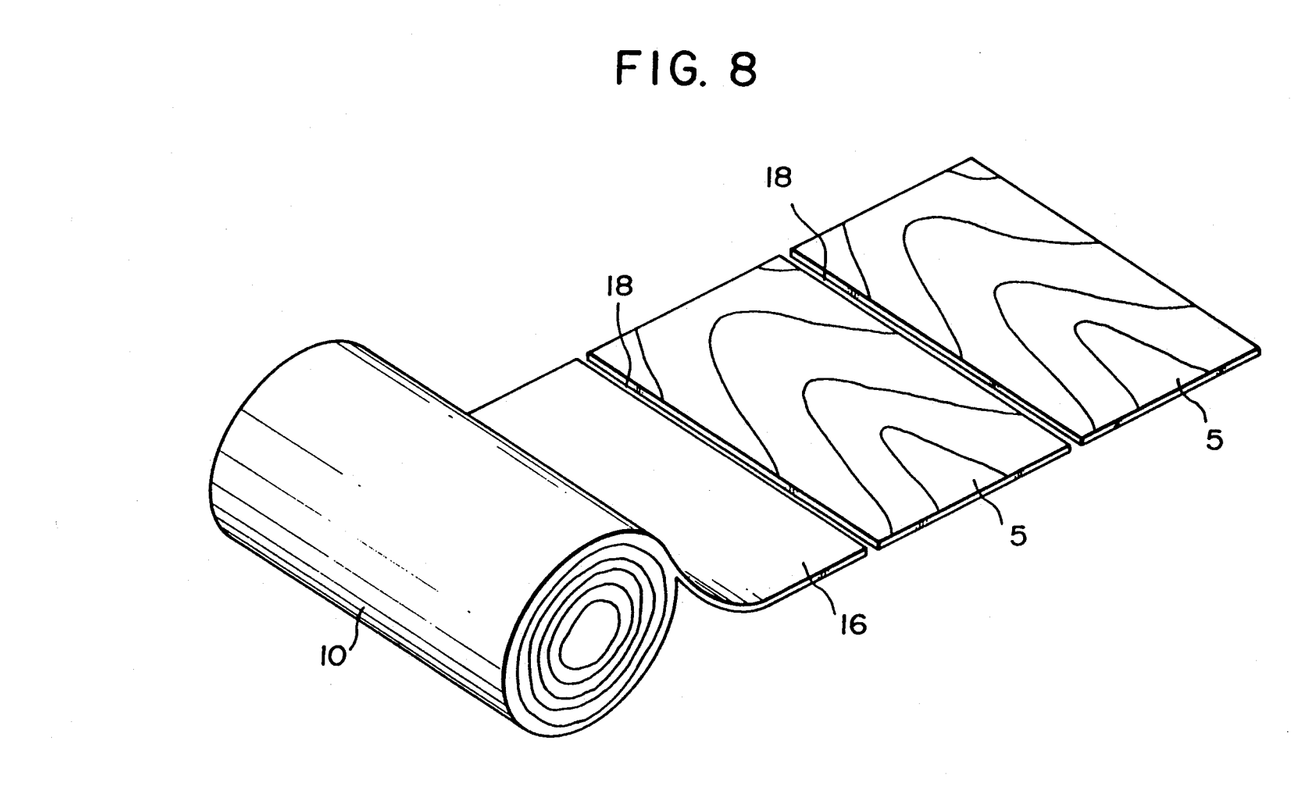
FIG. 8 is an explanatory view to show the process of manufacturing veneer by cutting a sheet of rotary-cut veneer sheet in a direction perpendicular to the feed direction.

The rotary-cut veneer sheet 16 peeled off from a log by the blade is subjected to cutting 18 in a direction perpendicular to the feed direction, as shown in FIG. 8, to obtain sheets of compressed veneer 5 of 600-1200 mm length, or any other length that corresponds to the surface area of the decorative laminated sheet to be obtained from the laminated veneer lumber 1 of the present invention.

Sheets of veneer 5 thus obtained are sent to a dryer device to remove the moisture content to a degree that would not impair flexibility. Immediately before or after subjecting sheets of veneer 5 to drying, those having knars or cracks that are too big to be tolerated are eliminated.

A sheet of veneer 5 having passed through a dryer is of a relatively small thickness of 2-3 mm. As a result, the veneer sheet 5 having been removed of a large portion of its moisture becomes wavy in all direction, as shown in FIG. 5 in an exaggerated manner. A wavy and irregular veneer sheet 5 if used as it is would result in unsatisfactory bonding in the later stage and reduce the workability. It is therefore necessary to flatten the same in advance.

Figure 9:
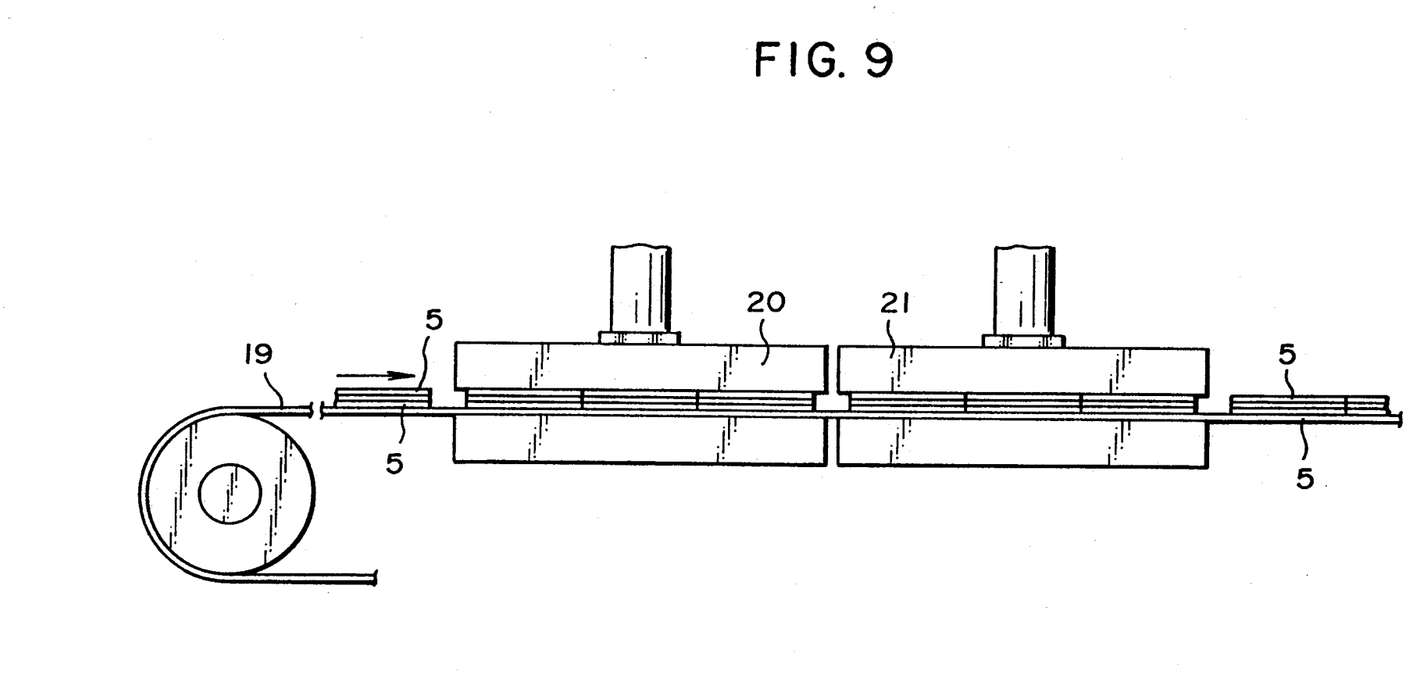
FIG. 9 is a view to explain the processes of hot press and cold press for flattening a rotary-cut or sliced veneer.

Plural dried veneer sheets 5 are laminated and sequentially passed through a hot press 20 and a cold press 21 under pressure, the presses being connected by an endless conveyer belt of intermittent motion, as shown in FIG. 9. The hot press 20 heats the veneer sheets to make it flexible, while the cold press 21 rapidly cools the heated veneer sheets 5 to remove irregularity thereof and flatten the same on both surfaces.

Processing with the hot press 20 is conducted at the temperature of 140° C. and pressure of about 1 kg/cm$^2$ for about 40-60 seconds to soften lignin contained in the veneer to thereby make the entire veneer sheet flexible.

Although sheets of laminated veneer 5 are passed through the hot and cold presses 20 and 21 respectively in this embodiment, one can conduct the process by arranging the sheets of veneer 5 horizontally instead of laminating.

Sheets of veneer generally flattened by the hot and cold presses are machined to have symmetrically diagonal end faces 5a in the grain direction (FIG. 2). The end face 5a of a veneer sheet 5 facing downward is abutted with the end face 5a of another sheet facing upward to be pressed and bonded together by means of adhesive. An elongated sheet of veneer 6 is thus obtained. When integrally bonding the veneer sheets 5, they are so arranged that the grain directions thereof are aligned.

Figure 3:
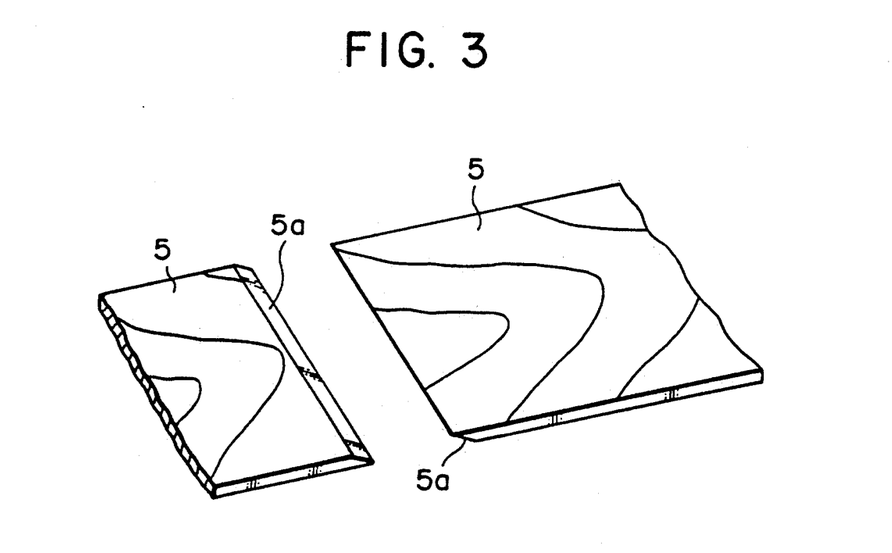
FIG. 3 is an enlarged perspective view to show the essential parts of a flattened veneer to be used in the laminated veneer lumber.

The elongated sheet of veneer 6 arranged in the same grain direction is then cut into sections of a predetermined length L along the grain direction, as shown in FIG. 3, to obtain sheets of laminated veneer material 2 with seams a.

A sheet of laminated veneer material 2 has seams a at least at portions thereof. The front and the back surfaces of this laminated sheet material 2 having seams a are applied, for example, with urea-base adhesive and pressed to be integrally laminated with their grains arranged in the same direction to obtain a laminated veneer core 3.

The core 3 may contain relatively small knars and minor cracks insofar as these defects would not lead to an extreme degradation of the product quality of the laminated veneer lumber 1.

A sheet of seamless veneer 4 having a predetermined length is placed on the surface of the thus obtained core 3 with the grains in parallel arrangement, and integrally laminated and bonded to obtain the laminated veneer lumber 1.

The veneer 4 to be bonded on the surface of the core 3 is, unlike the veneer material 2, seamless over its entire surface and is generally flattened. Its thickness is not particularly limited, although the core 3 in the embodiment has the same thickness as the laminated veneer material 2. Veneer as thin as 0.5 mm may also be used, and the laminated veneer lumber comprising such thin veneer sheets can be used as a decorative laminated sheet 7 by simply subjecting the same to machining.

The foregoing relates to a method of manufacturing laminated veneer lumber 1 of which the surface is covered with a seamless veneer sheet. Although the laminated veneer lumber according to claim 8 of this invention has seams exposed on its surface, it can be effectively used as a core for various structural materials because of its mechanical strength.

According to the present invention, generally flat and thin sheets of veneer of a predetermined length obtained by cutting a log with a rotary lathe, a slicer or the like are laminated and bonded to form a core, on which a sheet of seamless veneer is placed with the grain directions of both layers being in parallel with each other, and is integrally bonded. As a result, bonding of the veneer layers is very firm and of high quality, such that the final products can be applied to wide range of use such as construction, industry and daily necessaries because of their consistent mechanical properties.

A decorative laminated sheet can be obtained by simply machining the laminated veneer lumber into any desired form, ensuring economic efficiency. Diversified products are also available by changing the thickness and type of the veneer to be used on the surface.

According to the present invention method, sheets of veneer of a predetermined length obtained by cutting a log with a rotary lathe, a slicer or the like are alternately subjected to hot and cold presses to flatten the same, whereby the handling of the veneer sheets in the subsequent steps becomes facilitated.

The flattened veneer sheets are provided with symmetrically diagonal end faces in the grain direction and are bonded at said diagonally cut end faces. As a result, no warping or twisting will occur in the laminated veneer.

Sheets of veneer with their grain directions aligned are bonded at the end faces to obtain an elongated sheet of veneer, which in turn is cut along the grain direction into a predetermined length to obtain sheets of laminated veneer material having seams. Plural sheets of laminated veneer material are further laminated with their grain directions aligned to obtain the laminated veneer lumber. Because the veneer material has no warping or twisting, they can be firmly laminated and bonded with each other with ease. The resultant product of core material has excellent mechanical strength. Because the elongated sheet of veneer is cut into sections of a predetermined length, there is no loss in material, contributing to cost reduction.

Veneer sheet having no seams is overlaid on the surface of laminated veneer core, covering the seams of the core and improving the appearance of the resultant product of laminated veneer lumber. This widens the scope of use of the laminated veneer lumber. By changing the thickness or the raw material of the veneer to be placed on the core material, various types of veneer lumber can be easily obtained.

The present invention is particularly advantageous in that as the laminated veneer lumber is covered with another sheet of seamless veneer, decorative laminated sheets can be easily obtained by cutting the lumber into desired shapes.

According to the present invention method wherein a log is cut with a rotary lathe to obtaine a sheet of veneer, the log surface to be cut by blade of the rotary lathe is pressurized with a pressure bar to prevent cracks from occurring on the surface of the cut veneer, increasing the yield as well as the quality of the final product.

Use of deciduous North American woods is particularly advantageous for mass-producing high quality yet inexpensive laminated veneer lumber as the woods are available at low cost.

The laminated veneer lumber has high mechanical strength even when not covered with another sheet of seamless veneer, and can be effectively used as the core of various structural materials despite presence of seams.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What we claim is:

1. A laminated veneer lumber element, comprising:
   a plurality of sheets of generally flat veneer, each of a predetermined length and cut symmetrically diagonal across a thickness at respective end faces, each sheet being bonded at a diagonally cut end face to an adjacent abutting diagonally cut end face of another of said sheets with respective grain directions of said bonded sheets being aligned to form an elongated bonded sheet, said elongated bonded sheet being cut along the aligned grain directions into sections each of a predetermined length;
   a selected number of said elongate bonded sheets being laminated to each other with a suitable adhesive, with their respective aligned grain directions arranged in parallel, to form a laminated veneer core; and
   a sheet of flat and seamless veneer, integrally bonded to and covering an entire surface of said laminated veneer core.

2. The laminated veneer lumber element as claimed in claim 1 wherein:
   said sheets comprise a wood material; and
   said sheet of seamless veneer comprises a different wood material.

3. The laminated veneer lumber element as claimed in claim 1 wherein:
   said sheet of seamless veneer has a thickness less than a thickness of the each of said sheets in the laminated core.

4. The laminated veneer lumber as claimed in claim 1, wherein
   said laminated veneer core, covered by said flat and seamless veneer, is cut into desired shapes.

* * * * *